(12) United States Patent
Collier

(10) Patent No.: US 7,521,014 B2
(45) Date of Patent: Apr. 21, 2009

(54) BUILDING BLOCKS

(76) Inventor: Peter Collier, 2628 Bell's Line Road, Bilpin, New South Wales 2758 (AU)

( * ) Notice: Subject to any disclaimer, the term of this patent is extended or adjusted under 35 U.S.C. 154(b) by 0 days.

(21) Appl. No.: 10/275,468

(22) PCT Filed: May 7, 2001

(86) PCT No.: PCT/AU01/00520

§ 371 (c)(1), (2), (4) Date: Apr. 2, 2003

(87) PCT Pub. No.: WO01/85639

PCT Pub. Date: Nov. 15, 2001

(65) Prior Publication Data

US 2003/0172849 A1 Sep. 18, 2003

(30) Foreign Application Priority Data

May 5, 2000 (AU) .................................. PQ7461

(51) Int. Cl.
C04B 18/26 (2006.01)
B28B 1/14 (2006.01)
C04B 7/02 (2006.01)

(52) U.S. Cl. .................... 264/297.9; 264/333; 106/731

(58) Field of Classification Search ................ 264/157, 264/297.9, 318, 333, 297.8, 33, 310; 106/653, 106/730, 731, 805
See application file for complete search history.

(56) References Cited

U.S. PATENT DOCUMENTS

| 787,199 | A | * | 4/1905 | Lloyd ........................ 264/157 |
|---|---|---|---|---|
| 1,872,522 | A | * | 8/1932 | Stuckey ....................... 264/157 |
| 1,891,479 | A | * | 12/1932 | Norton ........................ 428/207 |
| RE24,527 | E | * | 8/1958 | Ripley .......................... 264/71 |
| 2,899,325 | A | * | 8/1959 | Kranz et al. ................. 106/658 |
| 3,197,313 | A | * | 7/1965 | Greiner .................... 106/18.29 |
| 3,274,660 | A | * | 9/1966 | Mizer et al. ................. 425/167 |
| 3,642,968 | A | * | 2/1972 | Clayton ........................ 264/82 |
| 3,870,238 | A | * | 3/1975 | Sellars ......................... 241/27 |
| 3,989,432 | A | * | 11/1976 | Depka ......................... 425/139 |
| 4,335,549 | A | * | 6/1982 | Dean, Jr. ........................ 52/98 |
| 4,666,521 | A | * | 5/1987 | Colin ......................... 106/716 |
| 4,769,964 | A | * | 9/1988 | Johnson et al. ............. 52/405.4 |
| 5,569,426 | A | * | 10/1996 | Le Blanc .................... 264/122 |
| 6,656,262 | B1 | * | 12/2003 | Schwam ..................... 106/672 |

FOREIGN PATENT DOCUMENTS

JP 05-194000 A * 8/1993

OTHER PUBLICATIONS

Machine English Translation of JP 05-194000 A, Jun. 2005, Japanese Patent Office website.*

Bouguerra et al., Effect of microstructure on the mechanical and thermal properties of lightweight concrete prepared from clay, cement, and wood aggregates, Cement and Concrete Research, vol. 8, No. 8, Aug. 1998, pp. 1179-1190.*

* cited by examiner

Primary Examiner—Matthew J. Daniels
(74) Attorney, Agent, or Firm—Galgano & Associates PLLC

(57) ABSTRACT

A cementitious mix for preparing a building block wherein the mix includes the ingredients; sand, cement, sawdust and water; wherein said sawdust comprises the greater proportion of the mix constituents; and wherein the dry density of the mix ranges between 700 kg/m3 and 1500 kg/m3.

19 Claims, 6 Drawing Sheets

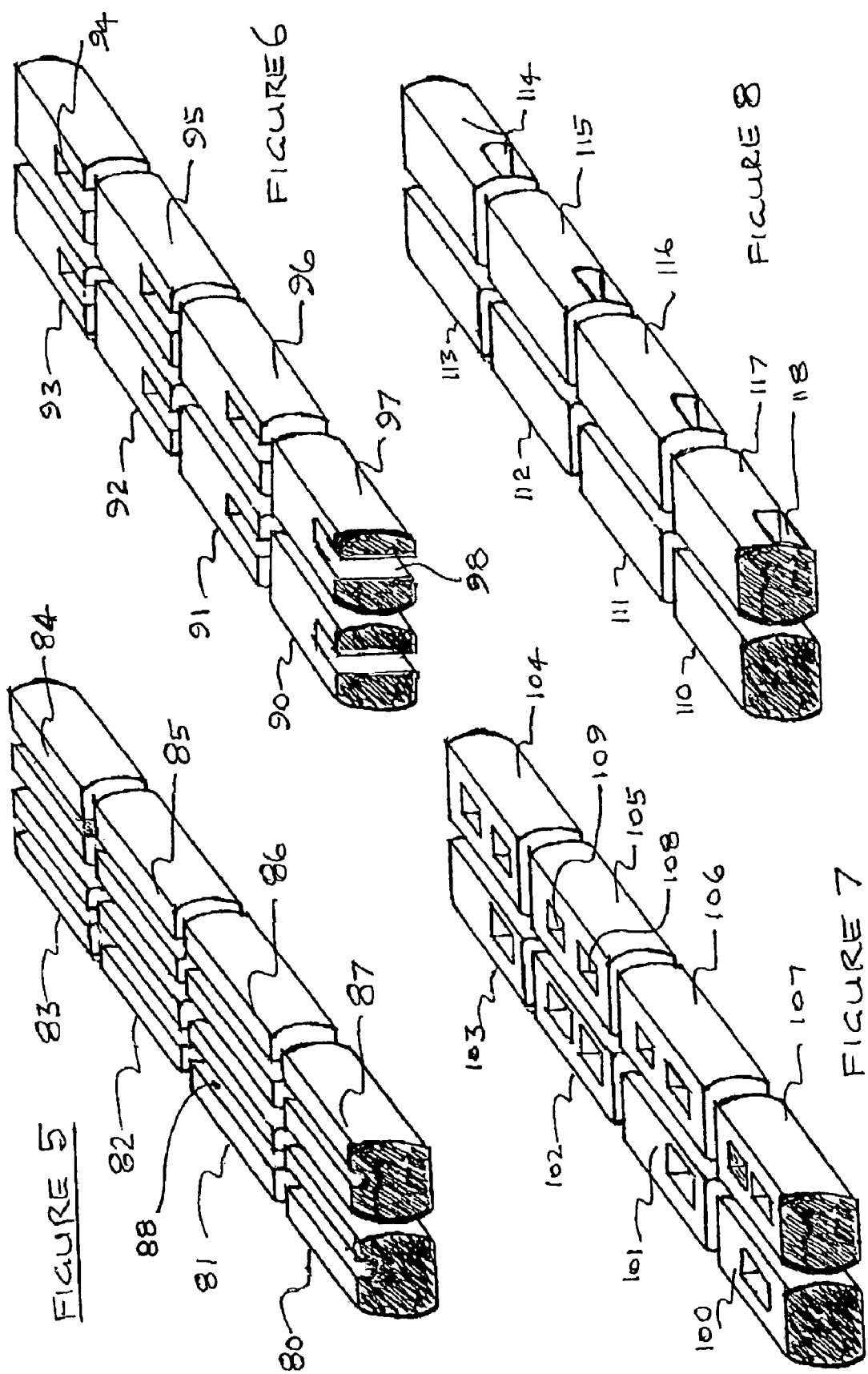

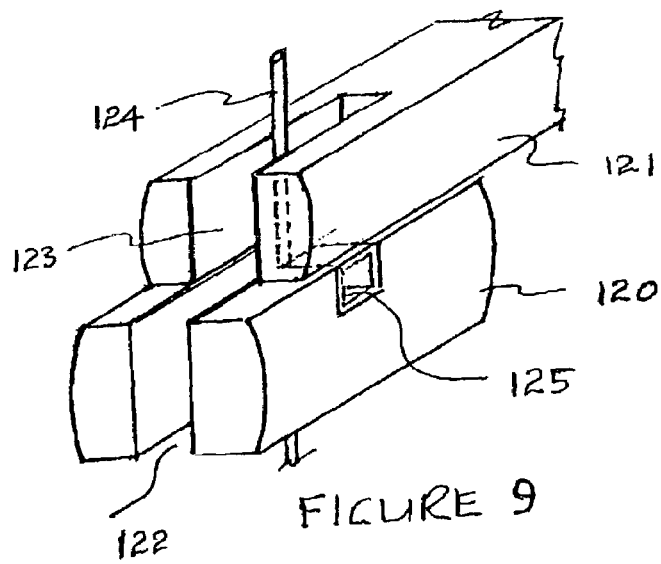
FIGURE 9
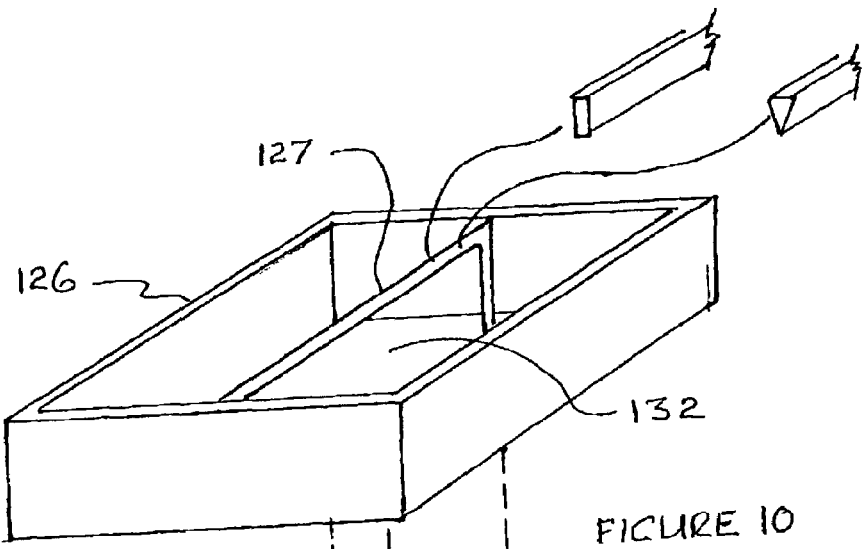
FIGURE 10
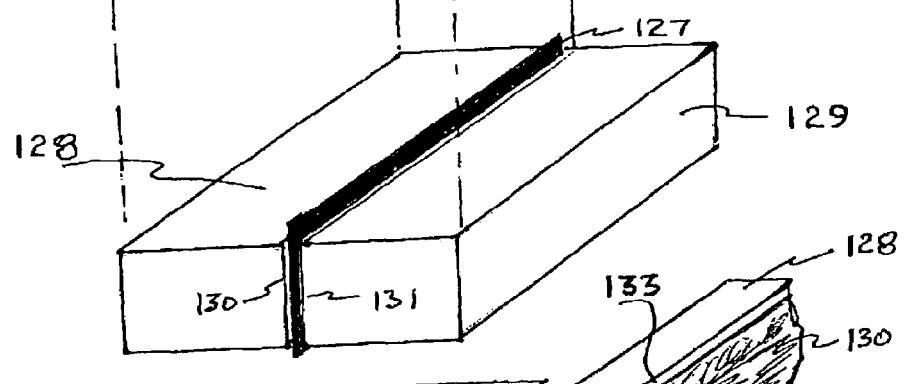
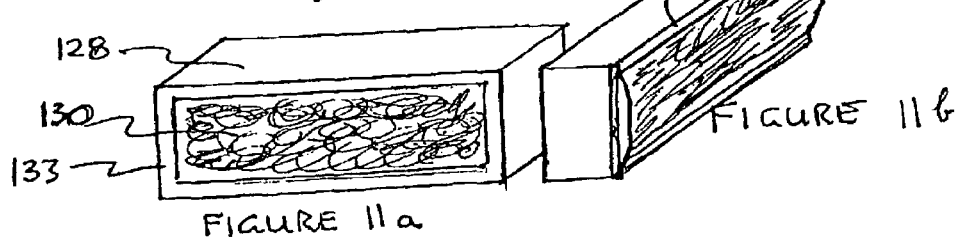
FIGURE 11a  FIGURE 11b

BUILDING BLOCKS

BACKGROUND

The present invention relates to building blocks and more particularly relates to light weight cement blocks for use in masonry construction having improved strength, shape and appearance characteristics. More particularly the invention relates to construction bricks or blocks which include wood, wood fibre or wood products in the mix.

PRIOR ART

There are a number of lightweight cement construction blocks available which incorporate sawdust as a constituent along with a predetermined ratio of cement and water.

One such construction block is disclosed in U.S. Pat. No. 5,241,795 which teaches a building material constructed from paper sludge and waste paper mixed with clay, portland cement and selected resins. The building material described in that patent has unusual compression strength properties which enables elastic deformation of the material under load rather than brittle fracture. That patent also recognises the use of wood fibre materials such as saw dust bound with resins.

U.S. Pat. No. 5,569,426 teaches the use of a cement block which is formed by mixing sawdust, water, sand and cement such that the sawdust is within the range of 30%-70% by volume, the sand is within the range of 10%-40% and the cement is in the range of 10%-40%. The blocks described in that patent are characterised by the use of sawdust as a primary constituent of the block. There are a number of additional US patents which disclose various building blocks which employ a variety of constituent materials. Examples of these are U.S. Pat. Nos. 4,885,203 and 5,024,035.

U.S. Pat. No. 5,782,970 discloses a lightweight concrete product which includes a cement mix which contains sawdust, diatomite, bentonite and lime. The material so formed may be used for the construction of wall panels and roof panels. Another form of building block is disclosed in U.S. Pat. No. 5,890,332, which teaches a reconstituted block modular building system. The reconstituted blocks are positioned horizontally side by side and stacked vertically downwardly.

U.S. Pat. No. 5,741,589 discloses a woody group material and cement which are combined to form a construction material. The material has finely split pieces of split wood, bamboo or the like.

None of the above patents disclose a method of constructing a construction block using a blend of ingredients in which sawdust is the highest proportion ingredient and which includes a finish which is produced by establishing a predetermined slump in the concrete mix. Nor does the prior art teach the advantages and affects of using different sand types and how that may impact on Strength, Aesthetics, Porosity, and Durability of the blocks.

The prior art has to date concentrated merely on the use of wood and wood derivatives in a cementitious mix for making blocks but has not considered to any practical extent, the variations in strength, aesthetics, porosity and durability of the blocks which might be achieved by substantial or subtle changes to the mix proportions and constituents.

In relation to strength and durability characteristics, the prior art teaches the use of sand that is clean or washed. That is, very little fines smaller than 150 microns and no fines smaller than 75 microns. Conventional wisdom teaches that good concreting sand tends to have large particle size which varies from approximately 3 mm down to 150 micron. Anything smaller than 150 microns is called Fines. Fines are normally a mixture of clay particles (alumina) or fine silica particles. There may also be other trace elements and organic impurities. Sand mining companies go to a great deal of effort to remove all or most of the fines, so that they can offer to various concrete companies clean washed sand. These companies in turn produce a range of concrete products such as bricks, pipes, dual top panels, concrete foundations etc. Such companies ask for a test certificate on the particle size distribution. This ensures that there are not too many fines, which normally compromise the structural integrity of the product. Cement and aggregate is then added to this washed sand to produce concrete. The prior art makes no reference to the best of the applicant's knowledge to the use and advantages of different sand types.

Use of wood and wood products in masonry blocks necessitates consideration of potential termite attack, but the prior art makes no reference to problems raised by the presence of termites or other timber-eating creatures. Previously, the known blocks were constructed in standard regular shaped moulds without much attention paid if any, to overall finish.

INVENTION

The present invention seeks to provide building blocks and methods of construction of such blocks as an alternative to the known wood based building blocks and to the known methods of construction of such blocks by providing a matrix and applying methods of construction which enhance the strength, aesthetics, porosity, finish and durability and appearance in the finished product. According to one embodiment, the finished block may resemble the rounded appearance of cobblestone with a rock face finish. According to an alternative embodiment the block includes a peripheral border on at least one face and a split rock face finish. According to a further embodiment, the block may include a channel for interlocking and/or a channel for services. According to a preferred embodiment, the dry density of the mix ranges between 909 kg/m3 and 1300 kg/m3.

In its broadest form the present invention comprises; a cementitious mix for preparing a building block wherein the mix includes the ingredients; sand, cement, sawdust and water; wherein said sawdust comprises the greater proportion of the mix constituents; and wherein the dry density of the mix ranges between 800 kg/m3 and 1500 kg/m3.

Preferably the cementitious mix ingredients are mixed in the following proportions;

| Sawdust: | within the range | 23 litres to 35 litres | (2.3-2.9 parts) |
|---|---|---|---|
| Sand: | within the range | 10 litres to 23 litres | (1.7-2.3 parts) |
| Cement: | | 10 Kg | (1 part) |
| Water: | within the range | 12 litres to 14 litres | (1.2 parts) | wherein the sand includes fines in a proportion per unit volume greater than 10% which would pass through a 150 micron mesh and wherein the fine sand includes silica and/or clay (alumina). Preferably, the proportion of silica is greater than the proportion of alumina with fine sand whose particulate size falls within the range of 150 microns or less.

The mix forms a construction block including at least one outer face in which at least part of said at least one outer face lies in a plane spaced apart from a plane in which the remaining part of said at least one face lies. Said at least one outer face is generally convex outward wherein said at least one part of said outer face provides the construction block with a rock face or cobblestone appearance. The mix when wet may according to one embodiment have a slump within the range 0.5 mm to 15 mm.

According to one embodiment, the construction block includes at least one internal cavity for services and/or a recess for keying or interlocking with adjacent blocks. The construction block is made by pouring said mix when wet into a mould.

In another broad form, the present invention comprises: a lightweight construction block formed in a mould from a mix of ingredients which include sand, water and a lightweight aggregate which is mixed according to a predetermined time/temperature regime; wherein the mix is capable of a wet slump during formation within the range of 0.5 to 15 mm, the slump resulting in a formation on said construction block which provides the block with at least one generally curved or irregular outer surface on at least one face of the block.

In a broad form of the method aspect the present invention comprises; a method of producing a construction block from a cementitious mix including the ingredients, sand, cement, sawdust and water; wherein said saw dust comprises the greater proportion of the mix constituents; and wherein the dry density of the mix ranges between 700 kg/m3 and 1500 kg/m3 wherein the method comprises the steps of;
a) dry blending said ingredients;
b) adding water during or after said dry blending of said ingredients to form a wet mix having a slump within the range of 0.5 mm to 15 mm;
c) placing said wet mix in a mould
d) allowing said wet mix to dry for a predetermined period
e) removing said mould to expose a formed construction block.

The sand includes fine sand whose particulate size falls within the range of less than 150 microns wherein the fine sand includes silica and/or clay (alumina). Preferably, the proportion of silica is greater than the proportion of alumina.

Preferably the method includes the step of blending the ingredients in the following proportions;

| Sawdust: | within the range | 23 litres to 35 litres | (2.3-2.9 parts) |
| Sand: | within the range | 11 litres to 23 litres | (1.7-2.3 parts) |
| Cement: | | 10 Kg | (1 part) |
| Water: | within the range | 12 litres to 14 litres | (1.2 parts) |

The method comprises the further step of causing in at least one face of said construction block, a rock face formation in which at least part of said at least one outer face lies in a plane spaced apart from a plane in which the remaining part of said at least one face lies. According to one embodiment the method further comprises introducing into an outer face of said block a peripheral border region.

In another broad form of the method aspect the present invention comprises:

a method of construction of a lightweight building block wherein the method comprises the steps of:
a) selecting a specific type of sand with a predetermined level of clay content for use in a mix to form a construction block;
b) taking a predetermined quantity of said sand and blending the sand with a predetermined mix of at least sawdust and cement;
c) mixing said sand, cement and sawdust according to predetermined proportions with a predetermined quantity of water;
d) introducing said mix into a mould;
e) allowing said mix to set for a predetermined period;

wherein the block produced from said mould has at least one of its faces which are generally curved in appearance, wherein said rock like appearance of at least one face of said block is achieved by selecting a mix which is capable of a predetermined level of slump and removing said mould at a predetermined time during setting of said mix.

In a further form of the method aspect the invention comprises: a method of constructing a lightweight building block wherein the method comprises the steps of:
a) selecting a specific type of sand with a predetermined level of clay content for use in a mix to form a construction block;
b) taking a predetermined quantity of said sand and blending the sand with a predetermined mix of at least a cellulose fibre material and cement;
c) mixing said sand, cement and cellulose fibre according to predetermined proportions with a predetermined quantity of water;
d) introducing said mix into a mould;
e) allowing said mix to set for a predetermined period;

wherein the block produced from said mould has at least one of its faces which are rock like in appearance, wherein said rock like appearance of at least one face of said block is achieved by selecting a mix which is capable of a predetermined level of slump.

Preferably the method comprises the further step; when at least two blocks are removed from the mould, opposing faces of said at least two blocks undergo slump to an extent that said faces engage whereupon release of said faces results in a block having a rock face appearance on said opposing faces.

In a further form the present invention comprises; a lightweight construction block formed in a mould from a mix which includes sand, water and a lightweight aggregate which is mixed according to a predetermined time and mix regime; wherein the mix when wet, has a slump which falls within the range of 0.5 to 20 mm; wherein the slump is such that it enables a formation in said construction block which provides a generally convex outward appearance on at least one face of the block; and wherein the block is held in a mould for a time period in the region of 20-40 minutes prior to removal of the mould. Preferably, at least two faces of said block are convex outward, wherein said convex faces are formed when said mould is removed.

Two opposing faces of adjacent blocks engage during setting of said mix and after slump of the mix, whereupon disengagement between said blocks prior to setting results in each said opposing faces having a rock like appearance. Preferably, the block includes a border about the periphery of said rock face.

According to one embodiment the ingredients may be mixed in the following proportions:

| Sawdust: | 29 litres | (2.9 parts) |
| Sand: | 17 litres | (1.7 parts) |
| Cement: | 10 Kg | (1 part) |
| Water: | 12 litres | (1.2 parts). | and the block includes chemical additives to resist termite attack.

The construction block additives for termite resistance may be selected from chemicals such as arsenic, cyanide, boron oxide, barium oxide or other toxic or non-toxic additives.

Preferably, the additives are placed in said water and said water is mixed with said saw dust to form a slurry prior to mixing said slurry with cement and sand.

In another broad form the present invention comprises; a lightweight construction block including sand, water and a wood fibre aggregate which is mixed according to a predetermined mix regime; wherein the mix prior to setting is capable of a predetermined slump during formation of the block, the slump resulting in a formation on said construction block which provides generally curved faces and with at least one of said faces having a rock face appearance.

In another broad form the present invention comprises; a lightweight construction block which includes sand, cement, wood products as fillers or aggregate and additives such that the block is capable of resisting termite attack due to inclusion in the mix of termite resistant chemicals.

In another broad form of the method aspect the present invention comprises a method of constructing a lightweight building block wherein the method comprises the steps of:
a) selecting a specific type of sand with a predetermined level of clay content for use in a mix to form a construction block;
b) taking a predetermined quantity of said sand and blending the sand with a predetermined mix of at least a cellulose fibre material and cement;
c) mixing said sand, cement and cellulose fibre according to predetermined proportions with a predetermined quantity of water;
d) introducing said mix into a mould;
e) allowing said mix to set for a predetermined period;

wherein the block produced from said mould has at least one of its faces which are rock like in appearance, wherein said rock like appearance of at least one face of said block is achieved by selecting a mix which is capable of a predetermined level of slump.

In another broad form of the method aspect the present invention comprises; a method of constructing a lightweight building block having a rock face appearance on at least one face of the block, wherein the method comprises the steps of:
a) selecting a specific type of sand with a predetermined level of clay content for use in a mix to form a construction block;
b) taking a predetermined quantity of said sand and blending the sand with a predetermined mix of at least a cellulose fibre material and cement;
c) mixing said sand, cement and cellulose fibre according to predetermined proportions with a predetermined quantity of water;
d) introducing said mix into a mould;
e) allowing said mix to set for a predetermined period;

wherein, the block produced from said mould has at least one of its faces which are rock like in appearance, wherein said rock like appearance of at least one face of said block is achieved by selecting a mix which is capable of a predetermined level of slump and allowing opposing faces of said blocks to come in contact as a result of said slump.

Preferably, the predetermined level of slump occurs when the block is released from the mould.

DETAILED DESCRIPTION

The invention will now be described in more detail according to a preferred embodiment and with reference to the accompanying illustrations wherein;

FIG. 5 shows an alternative block configuration produced from a corresponding mould.

FIG. 6 shows an alternative block configuration produced from a corresponding mould.

FIG. 7 shows an alternative block configuration produced from a corresponding mould.

FIG. 8 shows an alternative block configuration produced from a corresponding mould.

FIG. 9 shows an arrangement of blocks according to one embodiment including a recess for services and power points light switches and the like.

FIG. 10 shows an exploded view of a mould wherein a spacer or divider is used to create a border and rock face or cobblestone finish on a face of a brick.

Figure 1:
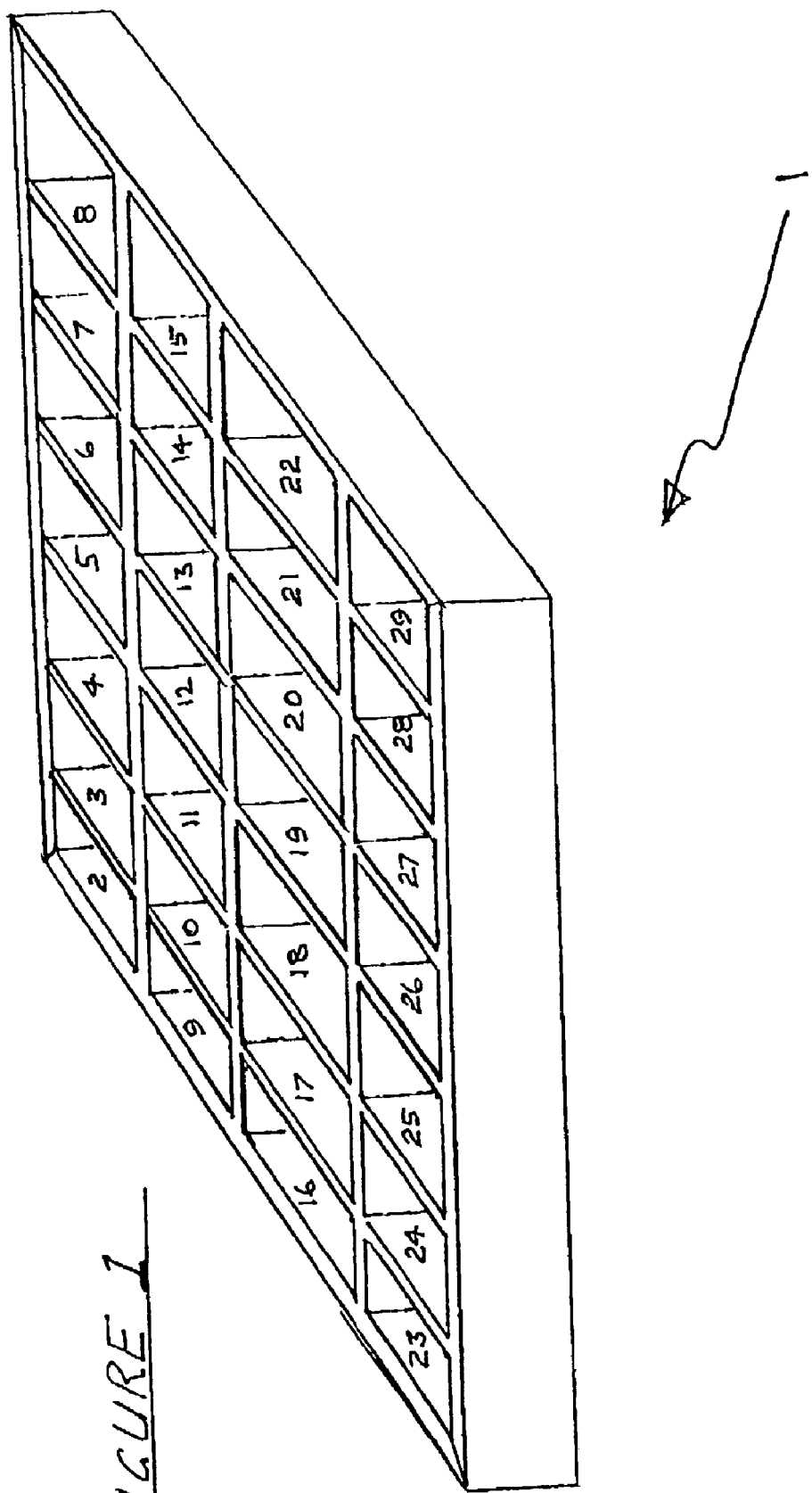
FIG. 1 shows a typical mould prior to filling with a mix for formation of construction blocks.

FIG. 11*a* shows a block made from the mould assembly of FIG. 10; and

FIG. 11*b* shows the block of FIG. 11*a* rotated to illustrate the block profile.

The invention to be described below with reference to various embodiments is enabled by use of a special blend of selected ingredients which when mixed according to the method aspects of the invention impart properties including durability, structural integrity and aesthetics to the finished construction blocks.

The mix is formed from a blend of at least sand, cement, wood or wood derivatives such as saw dust and water. The inventor made particular observations from the behaviour of conventional sand used in known block construction. An assumption which might be made, is that use of the same type of sand blend which would be selected for known block construction would result in similar properties and the same structural characteristics when sawdust was used as an aggregate material in block construction.

Sand can have particulate matter which includes, silica, alumina (clay) which are described as fines. Sand with an unacceptable amount of fines in conventional concrete construction (i.e. more than 10% that passes through 150 micron mesh) will normally result in a structural compromise to the block. In convention cement block construction, by using clean sand the block will normally demonstrate better compression test results than blocks made using a sand with an excess of fines. The inventor found that the opposite is true where wood based aggregates such as saw dust are used in block construction. When sand was used with fines which would normally be considered to be in excess, the resultant blocks out performed blocks made with the same sand but using an aggregate or filler other than wood based products.

Blocks constructed in accordance with the invention using sand having an excess of fines performed better in compression compared to the same blocks constructed using clean sand (i.e. sand with a minimum of fines).

There were also improvements in durability, in that sand that is fine and has more than 10% fines produces a more durable product than its clean or coarse counterpart. The finer particles help to bind the ingredients together. The end result is that there is less crumbling and particle dislodgment. There is however, an upper limit to the percentage of fines as an excess will begin to reverse the gained advantage. Generally, fine sand outperforms coarse sand in block compression tests for blocks made in accordance with the mix described herein.

It was found that sand that has in its fines a larger portion of silica particles rather than alumina (clay) particles, performs better in compression tests. Fines are normally a percentage blend of clay particles (alumina) and or silica particles. The presence of very fine silica or clay particles gives sand its fatty or sticky feel. Such sand can be easily compacted and will go hard in time. Sand that is fine or has with it more that 10% fines, produce a product that has less porosity than those sands that are washed or that are coarse. Sand that has with its fines, a small percentage of iron oxide, produces a more desirable colour. These colours range from Yellow Ochre to Orange Ochre through to Red Ochre. Colours can be blended in the moulds to produce a marbling affect. Mottled brick walls can be produced by using various coloured sands in each mix. If the sand doesn't inherit these colours; pigments or oxides need to be added. The Cobblestone or sand stone effect is partly created by carefully selecting the correct sand colour.

Preferably, the mix will remain in the mould according to the prevailing drying conditions but this will normally be for a time period between 5-45 minutes. In hot dry conditions, the mix stays in the mould for as little as 5 minutes before the moulds are removed. In cold wet conditions, the time period will be as much as 45 minutes. In extreme prevailing drying conditions, these time periods may decrease or increase. The cement constituent of the nix is ordinary off white, white or common grey cement although white cements are preferred.

Use of wood products such as sawdust or wood fibre differentiate the construction blocks from conventional masonry blocks. Sawdust has been used in blocks in the past but it is the blend of ingredients as described herein which differentiate the blocks constructed with the mix according to the invention from the known blocks which employ wood based aggregate.

There are many types of timbers (sawdust) available but they fall into two broad categories, a) Soft woods and b) Hard woods Soft woods are low-density or light weight timbers. Hard woods are high-density or heavy weight timbers. The inventor found that that low-density timber used in construction blocks significantly outperforms its high-density counterpart in thermal conductivity tests (R rating tests). The density of hard wood ranges from about 750 kg/m³ to 1000 kg/m³. The density of soft woods range from 350 kg/m³ to 500 kg/m³. It was found that low-density timber enhances R-values without significantly compromising structural integrity.

Referring to FIG. 1 there is shown a typical mould having its mould cavities filled with a mix according to one embodiment of the invention. Mould 1 includes an array of mould cavities 2-13 in which a mix according to a preferred embodiment of the invention is placed. Although the mould shown has 29 cavities it will be appreciated that this is an example only and moulds may be employed with a lesser or greater number of mould cavities.

A typical mix for production of a construction block according to the invention will be blended in the following proportions:

| Sawdust: | 29 litres | (2.9 parts) |
|---|---|---|
| Sand: | 17 litres | (1.7 parts) |
| Cement: | 10 Kg | (1 part) |
| Water: | 12 litres | (1.2 parts). | such that the dry density will preferably be 900 kg/m3.

Another mix may comprise the following proportions:

| SAND: | 23 litres by volume |
|---|---|
| SAWDUST | 23 litres by volume |
| CEMENT | 8 litres by volume or 10 kilos |
| WATER | 14 litres by volume. |

Figure 2:
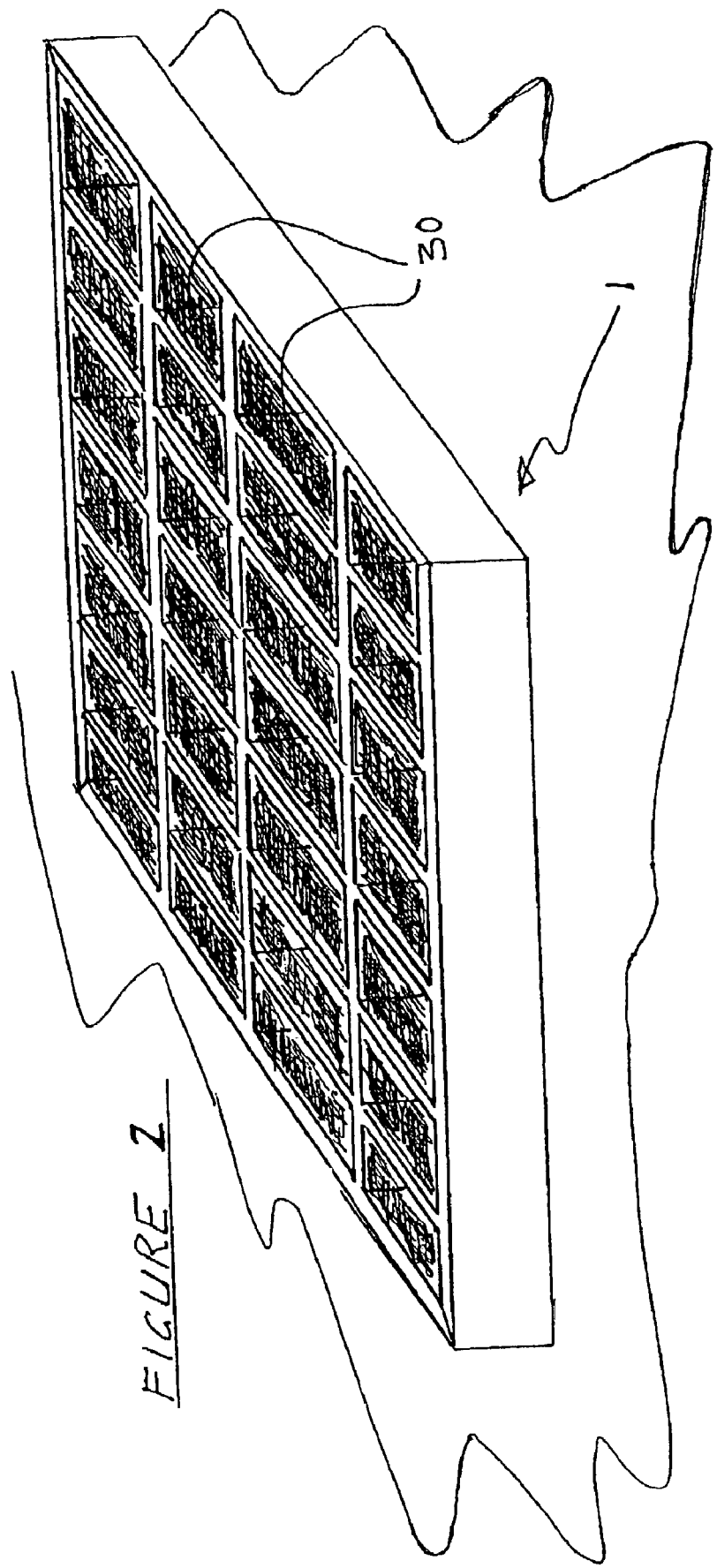
FIG. 2 shows a typical mould having its mould cavities filled with a mix according to one embodiment of the invention.

Referring to FIG. 2 there is shown mould 1 of FIG. 1 in which all cavities 2-29 are filled with a mix 30 according to a preferred embodiment of the invention. When mix 30 is poured into mould cavities 2-29 it is allowed to set for a predetermined period which will largely depend upon the prevailing thermal conditions. According to one embodiment the required finish of the blocks will be determined by the design slump. When mould 1 is removed, block walls are unsupported in which case, where the mix is not fully set a slump will occur for each block. The amount of the slump will determine the final shape of the block. Blocks according to one embodiment of the invention having curved outer walls will be described below, although it will be appreciated that a more conventional rectangular block shape may be achieved by allowing mix 30 to stiffen (dry) such that when released from mould 1 the blocks do not undergo slump. In that case the block walls will be vertical but the block will otherwise demonstrate the strength, durability aesthetic and thermal properties enabled by mix 3.

According to one embodiment, the blocks are characterised in that on completion they have a curved appearance on at least one face and in addition a rock face appearance on at least one face. The finished appearance of the blocks is achieved by means of a predetermined mix of constituents which provide a predetermined slump preferably between 0.5-15 mm which occurs following removal of the mould. The mix for the blocks will typically contain selected sand, water, cement and a filler or aggregate which can be sawdust or wood/cellulose based material as indicated above. Insufficient water in the mix will result in stiffness of the block and too much water will cause collapse of the block upon release from mould 1 and will also interfere with the structural integrity of the blocks. It will however be appreciated by persons skilled in the art that alternative mixes may be used to achieve the finish required and the requisite slump to achieve that finish. The correct mix is achieved by using a specific type of sand having the correct amount of clay content. Insufficient clay content prevents slump whereas too much clay content interferes with the structural integrity of the block under load.

The blocks may be constructed according to the following methodology. The dry ingredients for the mix are selected according to requisite proportions which are preferably in accordance with those indicted previously. The mix may be prepared first by dry mixing following which water is added. Alternatively, the water may be placed in a mixer first following which the ingredients such as saw dust, sand and nay additives etc are added. The mixing may take place using a conventional mixer or it may be hand mixed where a small quantity is required. Once the required mix has been achieved mix 30 is then introduced into mould 1 which may be single (not shown) or multiple cavity as shown in FIG. 1. From this point in the manufacture of the blocks, the steps taken are critical. Mix 30 is left in the mould for a period which will be in the region of 5-45 minutes depending upon prevailing weather conditions but would normally be 30 minutes. The duration will largely depend upon the water content. Judgement will be required as to when the moulds should be released. Should mould 1 be released too early, the blocks produced by the mould will slump into a heap and will be unusable. If mould 1 is taken away too late, the cement content will cause the blocks to set and become too stiff to undergo slump, so a curved finish will not be achieved. That in fact may be a desirable result in some cases.

Figure 3:
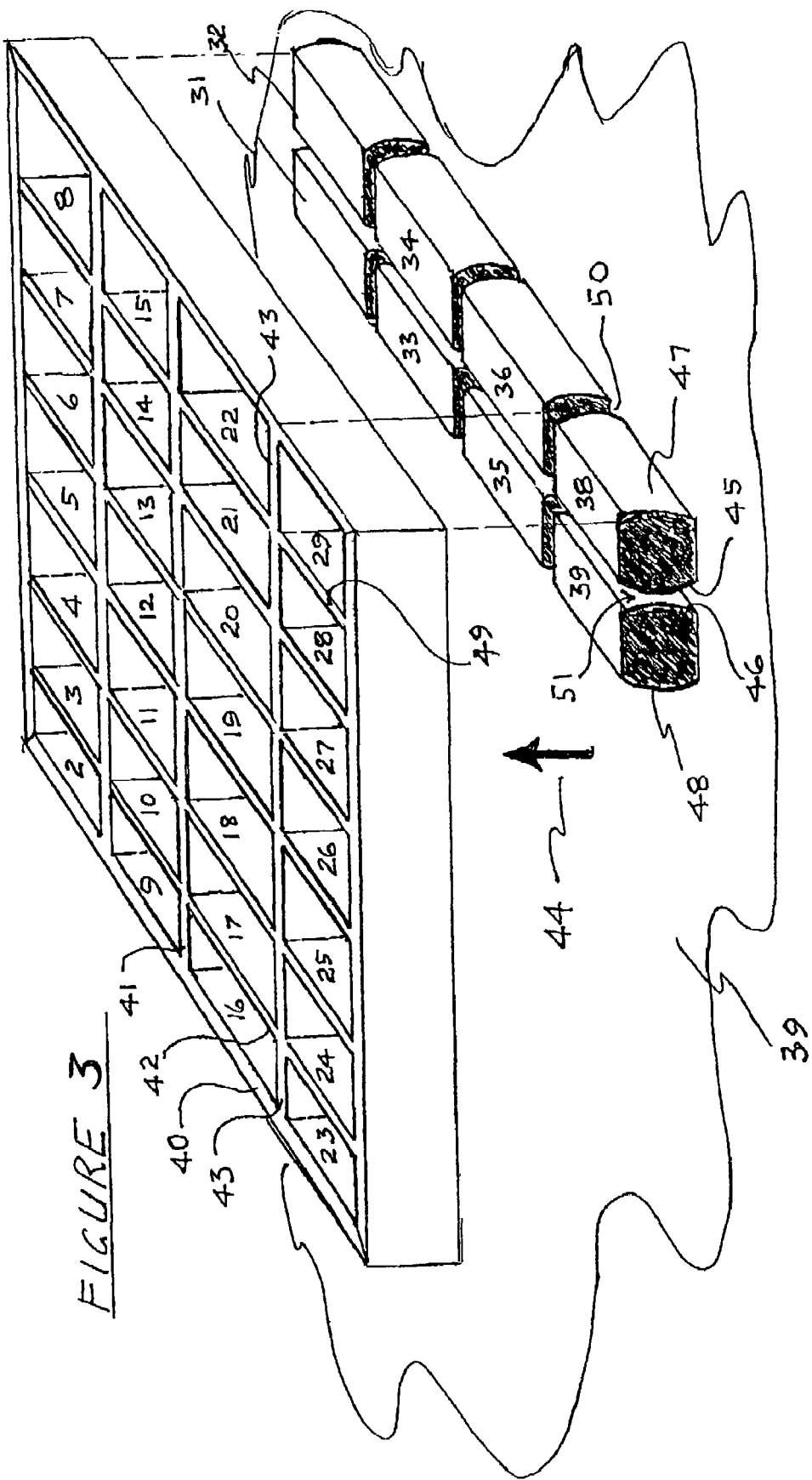
FIG. 3 shows a the mould assembly of FIG. 2 with construction blocks released from the mould according to a preferred embodiment of the invention.

Referring to FIG. 3 there is shown mould 1 with blocks 31-38 released from cavities 7, 8, 14, 15, 21, 22, 28, 29. The figure is abbreviated for clarity, but it will be appreciated that all blocks formed by mix 30 will be released at the same time. Once mix 30 (see FIG. 2) has set according to a predetermined time period, blocks may be released from the mould. Mould 1 will normally be placed on a flat surface 39 which will define a bottom surface of each block. Each mould cavity is separated from an adjacent cavity by a network of walls such as walls 40, 41, 42 and 43 arranged to form the plurality of cavities 2-29 each of which is separated only by the wall thickness. Once a predetermined setting period has elapsed, the mould is released from the blocks in the direction of arrow 44. This exposes the blocks 31-38 which are now free standing. FIG. 3 shows by way of example two rows of adjacent blocks laid end to end. Leading blocks 38 and 39 are placed such that walls 45 and 46 oppose. It can be seen from the embodiment of FIG. 3 that opposing walls 45 and 46 and outside walls 47 and 48 are curved. This effect is achieved by removing mould 1 at a predetermined time during setting and while the mix is still wet enough to allow a slump in the block when walls 45-48 are unsupported once mould 1 is removed. The same effect will occur in the remaining blocks as they will be fabricated from the same mix. Allowing slump in the block is optional. Accordingly, where it is required that the walls of the blocks produced from the mould remain vertical, the mix will be allowed to stiffen by an increase in the setting period based on environmental conditions at the time of setting.

In an alternative embodiment, the blocks are finished with at least one rock face. When blocks are released from mould 1 each block is separated by gaps which result from the thickness of the cavity walls. For example, walls 43 and 49 will create gaps 50 and 51. In the case where the rock face finish is required, gap 51 for example will be critical. The mould cavity wall thickness will typically be between 10 and 25 mm to allow the slump to occur when the mould is removed. Mould walls thinner than 10 mm will prevent slump as the blocks released from mould 1 will engage too early so the required slump will not be achieved. Moulds having walls wider than 25 mm will create too large a gap between the opposing faces of the blocks such that the opposing block faces will not contact each other to achieve the rock face finish. When slump occurs as mould is released, opposing walls 45 and 46 engage as these walls displace laterally. When blocks 38 and 39 are eventually separated, the mutual engagement of the opposing wall surfaces results in the rock face appearance described.

It is important that sand having the correct clay content be selected and the appropriate cement water/cement ratio be introduced. Once the correct mix is achieved and a mould having an appropriate wall width is selected, the remaining step which is the time the mix remains in the moulds is critical to the desired finish and is a matter of judgement by the manufacturer.

Ideally around 30 minutes will be the appropriate setting time. The bricks described above can be nailed or screwed and offer both thermal and insulating properties.

Figure 4:
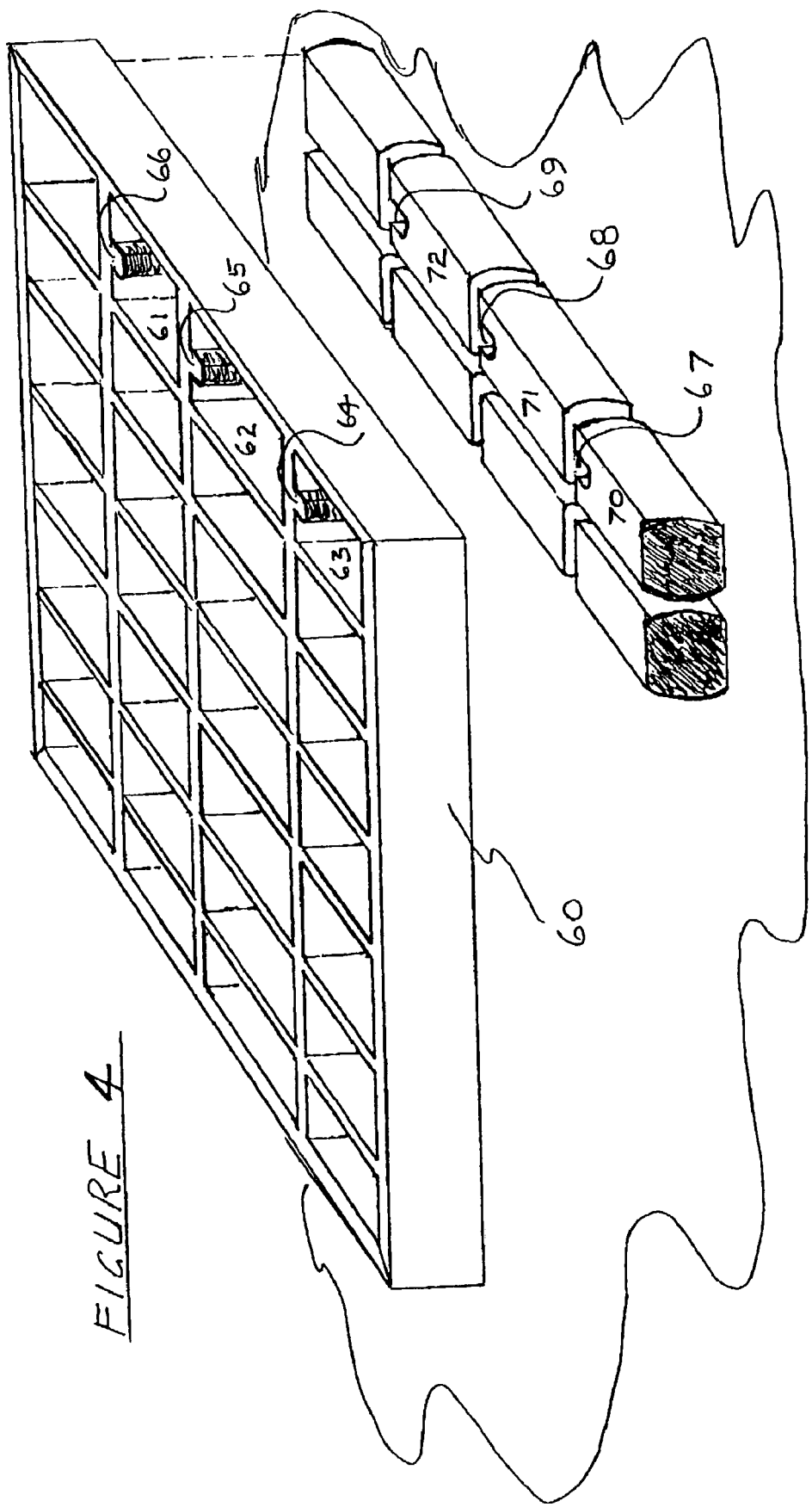
FIG. 4 shows a mould according to an alternative embodiment in which a mould cavity includes formations which provide formations in blocks such as channels or recesses.

FIG. 4 shows a mould 60 according to an alternative embodiment in which a mould cavities 61, 62 and 63 respectively include formations 64, 65 and 66 which provide corresponding recesses 67, 68 and 69 in blocks 70, 71 and 72.

FIG. 5 shows an alternative block configuration produced from a corresponding mould (not shown). Blocks 80-87 are shown with a horizontal channel which can house water pipes, electrical conduits, steel rods or horizontal bracing.

FIG. 6 shows an alternative block configuration produced from a corresponding mould. Blocks 90-97 each include a grooves 98 approximately 35 mm wide and a little over half way through the block to accommodate electrical conduits, water pipes or steel rods for cyclonic conditions and/or vertical bracings.

FIG. 7 shows an alternative block configuration produced from a corresponding mould. Blocks 100-107 each include a large cavities 108 and 109 from top to bottom approximately 100 mm in diameter or square. The cavity houses a steel rod and is also filled with high strength concrete for a vertical bracing or increased load bearing. Blocks may contain double cavities as in block 105 or single cavities as in block 100.

FIG. 8 shows an alternative block configuration produced from a corresponding mould. Blocks 110-117 include an electrical housing box 118 placed into the blocks. Blocks 110 may be combined with blocks 90-97 shown in FIG. 6 in which case electrical conduits and other services may be used in conjunction with box 118 as shown for blocks 110-117. Electrical housing box 118 maybe placed anywhere along the block and houses light switches, power points, fan switches or the like.

An alternative block arrangement was shown in FIG. 4 and includes grooves 67-69 approximately 35 mm wide out of one end of the block to house electrical conduits, water pipes, steel rods or vertical bracings. Combinations of the configurations of the above block types may also be achieved.

The blocks described may accommodate electrical conduits, power point boxes, water pipes and steel cyclone rods. Block types shown in FIGS. 4, 5 and 6 eliminate the arduous task of cutting channels to house services, which is the normal practice for single skinned structures. Block type shown in FIG. 8 houses a power point box, which also saves time and expense which would other wise be the case in having to cut out holes to mount a flush type power point or light switch.

In an alternative embodiment a block includes a bevelled and split face block with the bevelled and split face on one or more sides, and on the other side or sides either flat or cobble stone.

According to an alternative embodiment, a steel, alloy or timber plate 5 mm-20 mm wide and 5 mm-50 mm deep may be used as a block divider during formation of the blocks. The steel, alloy or timber divider is used which may be fiat or triangular. The blocks that are made using type the divider are initially joined. The divider whether it is the flat type or the triangular type creates a weakness where the blocks are split once they have hardened. The grooves left by the dividers create a weakness and prevent the split from running off track. According to an alternative embodiment, a divider may be 10 mm-50 mm high and 2 mm-18 mm thick.

Known construction blocks which employ wood products as filler and/or aggregate do not include additives which render the timber products to be free from termite attack. According to one embodiment there is provided a construction block which includes therein an internal membrane or physical barrier which prevents termite attack. An alternative approach is to select timber products which are less prone to termite attack. A further alternative is to utilize chemicals which are termite resistant. Such chemicals may include arsenic, cyanide, boron oxide, barium oxide or other toxic or non-toxic additives. These additives are placed in the water whereupon the sawdust is mixed with the water and allowed to sit for a time whilst the sawdust is 'marinated' with the chemical deterrent. To this water mix, the cement and sand is then added.

FIG. 9 shows an arrangement of blocks according to one embodiment including a recess for services and power points light switches and the like. Blocks 120 and 121 are laid according to conventional methods. Blocks 120 and 121 have respective recesses 122 and 123 which receive service conduit 124. Service conduit 124 may feed power point or light socket 125. Preferably, power point socket 125 is placed in the mould when the mix is still wet. Blocks 120 and 121 are similar to those described as for FIG. 6.

FIG. 10 shows an exploded view of a mould 126 wherein a spacer or divider 127 is used to create a border and rock face or cobblestone finish on a face of a block. Mould 126 produces blocks 128 and 129 which are initially delivered from mould 126 with spacer 127, disposed therebetween. This keeps apart a border region of the blocks but allows partial face contact between opposing faces 130 and 131 due to opening 132 of spacer 127. FIG. 11a shows block 128 made from the mould assembly of FIG. 10 with face 130 exposed. Block 128 includes border region 133 which is formed by spacer 127. FIG. 11b shows the block 128 of FIG. 11a rotated to show its profile. Preferably, the blocks are split when cured.

The table below provides examples of block specifications

BLOCK SPECIFICATION AND LAYING DIMENSIONS

| Average Block Size Mm | Dry Weight kg | Density kg/m³ | Compressive strength Tonnes | Type |
|---|---|---|---|---|
| 405 L × 165 h × 200 w | 11.6 | 909 | 3.3 mpa or 27 tonnes | Lightweight |
| 405 L × 165 h × 200 w | 16.5 | 1300 | 5.3 mpa or 45 tonnes | Extra Strong |
| 405 L × 165 h × 200 w | 7.5 | 909 | 3.3 mpa or 16.7 tonnes | Lightweight |
| 405 L × 165 h × 200 w | 10.4 | 1300 | 5.3 mpa or 28 tonnes | Extra Strong |

BLOCK WEIGHT PER m²

| | | |
|---|---|---|
| .200 mm wide | 181 kg/m² | Lightweight |
| .200 mm wide | 260 kg/m² | Extra Strong |
| .120 mm wide | 109 kg/m² | Lightweight |
| .120 mm wide | 156 kg/m² | Extra Strong |

Test Results

Compressive tests were performed on blocks made from the mix according to the preferred embodiment of the invention. Blocks tested had dimensions 190 mm long, 186 mm wide and 168 mm high. The results of the compression tests are set out in the table below.

TABLE

| MIX | SAND TYPE | LOAD TO FAILURE |
|---|---|---|
| 5 Parts saw dust 3 Parts Sand | Course washed sand | 144 kN |
| 5 Parts saw dust 3 Parts sand | Yellow brick layers sand (All fines) | 196 kN |
| 4 Parts saw dust 4 Parts sand | Washed concreting sand (Common grade) | 207 kN |
| 4 Parts saw dust 4 Parts sand | Yellow brick layers sand (All fines) | 281 kN |
| 4 Parts saw dust 4 Parts sand | Alternative Yellow brick layers sand (Common grade) | 299 kN |

TABLE-continued

| MIX | SAND TYPE | LOAD TO FAILURE |
|---|---|---|
| 4 Parts sand | (Common grade) | |

The above tests demonstrate that a mix using saw dust either greater to or equal to the sand content and using sand with a high percentage of fines will deliver higher compressive strength compared to a block formed using washed or equivalent sand. During the tests, the loads were applied normal to horizontal surfaces of the blocks.

The claims defining the invention are as follows:

1. A method of constructing a lightweight building block having a rock face appearance on at least one face of the block comprises the steps of:
   a) selecting a specific type of fine sand with a predetermined level of alumina content for use in a mix to form said building block said fine sand including fines in a proportion per unit volume greater than 10% which would pass through a 150 micron mesh;
   b) taking a predetermined quantity of said fine sand and blending said fine sand with a predetermined mix of at least a cellulose fiber material and cement;
   c) mixing said fine sand, said cement and said cellulose fiber with a predetermined quantity of water, wherein the dry density of the blended mix ranges between 700 kg/m³ and 1500 kg/m³;
   d) introducing said mix into a mold;
   e) allowing said mix to set for a predetermined period; and wherein each of said blocks produced from said mold has multiple faces, wherein at least one of said faces are cobblestone-like in appearance, and wherein said cobblestone appearance of said at least one face of said block is achieved by selecting a mix which is capable of a predetermined level of slump and allowing opposing faces of adjacent blocks to come in contact as a result of said slump.

2. A method according to claim 1, wherein said fine sand, said cement, said cellulose fiber material and said water are mixed according to the following proportions:

| | | | |
|---|---|---|---|
| Cellulose fiber: | within the range | 23 liters to 35 liters | (2.3-2.9 parts) |
| Fine Sand: | within the range | 11 liters to 23 liters | (1.7-2.3 parts) |
| Cement: | | 10 Kg | (1 part) |
| Water: | within the range | 12 liters to 14 liters | (1.2 parts). |

3. A method according to claim 1, wherein a divider is placed in said mold to separate a border region of said opposing faces of said blocks.

4. A method according to claim 3, wherein said divider comprises a frame having a plurality of walls which define a plurality of mold cavities which walls are dimensioned such that when the divider is removed a gap is created which allows contact between said opposing faces of said blocks.

5. A method according to claim 4, wherein said divider is rectangular in profile.

6. A method according to claim 4, wherein said divider is triangular in profile.

7. A method according to claim 6, wherein each block is held in said mold for a time period in the range of 20-40 minutes prior to removal of blocks from said mold.

8. A method according to claim 7, wherein at least two faces of said block have a convex shape and wherein said convex faces are formed by a slump of said mix when said mold is removed.

9. A method according to claim 8, wherein two opposing faces of adjacent blocks engage during setting of said mix whereupon disengagement between said blocks prior to setting results in each of said opposing faces having a rock-like appearance.

10. A method according to claim 9, wherein said opposing faces having said rock-like appearance are formed with a flattened peripheral border.

11. A method according to claim 10, wherein said mix has a slump within the range of 0.5-20 mm laterally relative to a wall of said mold.

12. A method according to claim 11, wherein additionally comprising the step of adding chemical additives to resist termite attack of said block.

13. A method according to claim 12, wherein said chemical additives are selected from the group consisting of arsenic, cyanide, boron oxide, barium oxide.

14. A method according to claim 12, wherein said chemical additives are toxic additives.

15. A method according to claim 12, wherein said chemical additives are non-toxic additives.

16. A method according to claim 12, wherein said additives are placed in said water and said water is mixed with said cellulose fibers to form a slurry prior to mixing said slurry with said cement and said fine sand.

17. A method according to claim 1, wherein said fine sand comprises a member selected from the group consisting of silica, alumina and a combination thereof.

18. A method according to claim 17, wherein the proportion of silica is greater than the proportion of alumina.

19. A method of construction of a lightweight building block formed in a mold from a cementitious mix comprising fine sand, cement, cellulose fiber and water, and wherein said cellulose fiber comprises the highest proportion of said mix constituents, the method comprising the steps of:
 a) selecting a specific type of said fine sand with a predetermined level of alumina content for use in said mix to form said building block, said fine sand including fines in a proportion per unit volume greater than 10% which would pass through a 150 micron mesh;
 b) taking a predetermined quantity of said fine sand and blending said fine sand with a predetermined mix of said cellulose fiber and said cement;
 c) blending said fine sand, said cement and said cellulose fiber with a predetermined quantity of said water, wherein the dry density of the blended mix ranges between 700 kg/m$^3$ and 1500 kg/m$^3$ to form a blended mix;
 d) placing two molds side by side;
 e) introducing said blended mix into said molds;
 f) allowing said blended mix to set for a predetermined setting period to form blocks;
 g) removing said molds when said blended mix has reached a predetermined setting condition;
 h) allowing each of said blocks to slump to an extent such that opposing faces of adjacent blocks engage during a final setting period, and
 i) releasing the faces from said engagement whereupon release of said faces results in adjacent blocks having a rock face appearance on said opposing faces.

* * * * *